(12) United States Patent
Tan et al.

(10) Patent No.: US 6,851,200 B2
(45) Date of Patent: Feb. 8, 2005

(54) REFLECTING LIGHTED LEVEL

(75) Inventors: P. David Tan, Emporia, KS (US); Vicki Sickler, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 10/389,635

(22) Filed: Mar. 14, 2003

(65) Prior Publication Data

US 2004/0177524 A1 Sep. 16, 2004

(51) Int. Cl.$^7$ ................................................. G01C 9/32
(52) U.S. Cl. ...................................... 33/348.2; 33/379
(58) Field of Search ........................ 33/348, 348.2, 33/379

(56) References Cited

U.S. PATENT DOCUMENTS

| | | | | |
|---|---|---|---|---|
| 2,790,069 | A | * | 4/1957 | Alexander .................. 33/348.2 |
| 3,114,507 | A | * | 12/1963 | Henry ....................... 33/348.2 |
| 3,192,375 | A | * | 6/1965 | Olson ........................ 33/348.2 |
| 3,584,212 | A | | 6/1971 | Hansen |
| 4,154,000 | A | | 5/1979 | Kramer |
| 4,164,077 | A | | 8/1979 | Thomas ....................... 33/348 |
| 4,407,075 | A | | 10/1983 | MacDermott et al. |
| 4,484,393 | A | | 11/1984 | LaFreniere |
| 4,610,094 | A | | 9/1986 | Robson et al. ................ 33/348 |
| 4,755,801 | A | * | 7/1988 | Gooley ........................ 33/379 |
| 4,833,788 | A | | 5/1989 | Munro |
| 4,876,798 | A | * | 10/1989 | Zimmerman ................. 33/348.2 |
| 4,912,854 | A | | 4/1990 | Weadon |
| 4,956,922 | A | * | 9/1990 | Bodewes ..................... 33/348.2 |
| 5,020,232 | A | | 6/1991 | Whiteford |
| 5,025,567 | A | | 6/1991 | McWilliams et al. |
| 5,075,978 | A | | 12/1991 | Crowe |
| 5,101,570 | A | * | 4/1992 | Shimura ...................... 33/379 |
| 5,180,221 | A | * | 1/1993 | Yoder ........................ 33/348.2 |
| 5,761,818 | A | * | 6/1998 | Hopkins et al. ............... 33/379 |
| 6,115,928 | A | * | 9/2000 | Dauerer ....................... 33/348 |
| 6,343,422 | B1 | * | 2/2002 | Takahashi ..................... 33/379 |
| 6,681,494 | B1 | * | 1/2004 | Bowden ....................... 33/379 |
| 2004/0000062 | A1 | * | 1/2004 | Hansen et al. ................ 33/348 |

FOREIGN PATENT DOCUMENTS

| | | |
|---|---|---|
| CA | 1125497 | 6/1982 |
| CA | 1138635 | 1/1983 |
| EP | 0381373 | 8/1990 |
| EP | 0656524 | 7/1995 |
| EP | 1167921 | 2/2002 |
| EP | 0971206 | 3/2002 |

* cited by examiner

*Primary Examiner*—G. Bradley Bennett
(74) *Attorney, Agent, or Firm*—Hovey Williams LLP

(57) ABSTRACT

A reflecting lighted level (10) for facilitating leveling of an object, the reflecting lighted level (10) broadly comprising a generally frustoconically-shaped vial (12) having first and second exterior surfaces (22,24) and an internal angled reflecting surface (26); a light source (14) for emitting light; a light tube (16) for focusing or concentrating the emitted light towards the vial (12); a base (18) for supporting the vial (12); and a power source (20) for powering the light source (14). The internal angled reflecting surface (26) within the vial (12) is positioned at a generally 45° angle for reflecting light. The light source (14), a light emitting diode ("LED"), is centrally positioned relative to the vial (12). The light tube (16) is positioned proximate to the first exterior surface (22) of the vial (12), such that the light tube (16) is positioned between the light source (14) and the vial (12). The light source (14) is then partially positioned within the light tube (14). The light emitted by the light source (14) is transmitted through the light tube (16) and exits the light tube (16) in a concentrated beam. The beam of light is then incident on the first exterior surface (22) of the vial (12). If the level (10) is level, the beam of light reflects off of the internal angled reflecting surface (26) at a generally 90° angle and exits the second exterior surface (24) of the vial (12) in a generally concentrated beam so that a user of the level (10) may determine from a distance whether the level (10) is level. If the level (10) is unlevel, the concentrated beam of light incident on the first exterior surface (22) of the vial (12) is diffused throughout the vial (12), and the user sees little or no light, thus recognizing that the level (10) is unlevel.

25 Claims, 8 Drawing Sheets

REFLECTING LIGHTED LEVEL

BACKGROUND OF THE INVENTION

1. Field of the Invention

The present invention relates to levels. More particularly, the invention relates to a lighted level operable to reflect emitted light when the level is level and to diffuse the emitted light when the level is unlevel so that a user of the level can easily determine when an object is level.

2. Description of the Prior Art

Levels are commonly used to ensure than an object, such as a beam, stud, or other building material, is level. One problem with conventional levels, however, is that an air bubble contained within the vial is difficult to see in dim light or in the dark. Additionally, a user of the level must be very close to the level so that the user may determine the location of the air bubble within the level.

Lighted or illuminated levels have been developed to solve the above-described problems. Prior art lighted levels function by providing a general light source that illuminates a vial of the level so that a user of the level can observe center markings on the vial and the air bubble contained within the vial, even in the dark. Unfortunately, merely illuminating the level suffers from several limitations. First, it still requires the user to be close to the vial in order to see the center markings. Additionally, the light provided by the light source is diffused throughout the vial and thus, provides no light concentration. Furthermore, the user is required to observe the vial from an angle that is approximately 90° to the center of the vial, since viewing from other angles creates error in leveling due to parallax, an apparent difference in the position or direction of the bubble when it is viewed from two different points. Further yet, if the level is used, for example, to level a trailer pulled by a vehicle, then a first user must drive the vehicle while a second user monitors whether the level reads level.

To remedy some of these limitations, later prior art level designs construct a cumbersome and rather expensive device that uses at least four apertures through which light is shined to determine whether an object is level. An example of such a design is disclosed in U.S. Pat. No. 4,484,393 (the '393 patent) to LaFreniere. The '393 patent discloses a traditional level, including a housing and a vial filled with a liquid to form an air bubble that marks center. A rear of the housing is provided with two slots or apertures through which a light source emits light, such that two light paths are directed through the vial. A front of the housing is also provided with two apertures. When the air bubble is centered, each light path does not interfere with the air bubble and proceeds through the vial and the two apertures in the front of the housing. However, when the air bubble is not centered, a particular light path refracts through the air bubble such that the light path does not proceed through the aperture in the housing and is thus diffused.

Unfortunately, the level disclosed in the '393 patent still suffers from several limitations. First, due to the angle at which the path of light refracts through the air bubble when it is not centered, varying amounts of light may be diffused, thus requiring a user of the level to distinguish between varying degrees of brightness. Additionally, even when the air bubble is not centered, at least one path of light will still shine through, as illustrated in FIG. 2 of the '393 patent. Therefore, not only must a user determine how bright the path of light is that is diffused, due to refraction through the air bubble, but the user must also compare the brightness of the second path of light which proceeds through one of the apertures in the front of the housing. Furthermore, the design of the '393 patent is complex and expensive to construct in that is requires a specially aligned housing, encasing a majority of the vial, to accommodate the apertures, as illustrated in FIG. 3. Further yet, as illustrated in FIG. 3, the '393 patent's design does not provide the user the option of viewing the degree to which an object may be unlevel.

Since the apertures in the front of the housing are positioned on either side of center of the vial (see FIGS. 1 and 2) and since the apertures are positioned outside a viewing window of the vial, then the user cannot view the whole air bubble unless it is exactly centered.

Accordingly, there is a need for an improved level that overcomes the limitations of the prior art. More particularly, there is a need for a reflecting lighted level that illuminates a vial, yet does not require a user to be near to the level to determine whether an object is center. Additionally, there is a need for a reflecting lighted level that concentrates the light when the level is level as opposed to merely diffusing the light irrespective of whether the level is level or unlevel. Further, there is a need for a reflecting lighted level that does not distort the perception of an air bubble within the vial due to parallax so that the user of the level may accurately view the air bubble from any angle. Furthermore, there is a need for a reflecting lighted level that concentrates light and does not require a user of the level to determine when an object is level by distinguishing between varying degrees of brightness. There is also a need for a lighted level that is small and inexpensive to construct and that provides a user the option of viewing the level in a traditional manner using center markings or viewing the level from a distance using the emitted light to guide center.

SUMMARY OF THE INVENTION

The present invention solves the above-described problems and provides a distinct advance in the art of levels. More particularly, the present invention provides a reflecting lighted level that emits a concentrated beam of light when the level is level and that diffuses light so that no concentrated beam of light is emitted when the level is unlevel.

The reflecting lighted level of the present invention broadly includes a generally frustoconically-shaped vial having first and second exterior surfaces and an internal angled reflecting surface; a light source for emitting light; a light tube for focusing or concentrating the emitted light towards the vial; a base for supporting the vial; and a power source for powering the light source. The angled surface within the vial is preferably positioned at a generally 45° angle for reflecting light. The light source, preferably a light emitting diode ("LED"), is preferably centrally positioned relative to the vial. The light tube is preferably positioned proximate to the first exterior surface of the vial and between the light source and the vial. The LED is then preferably partially positioned within the light tube. The light emitted by the LED is transmitted through the light tube and exits the light tube in a concentrated beam. The beam of light is then incident on the first exterior surface of the vial. If the level is level, the beam of light reflects off of the angled surface at a generally 90° angle and exits the second exterior surface of the vial in a generally concentrated beam so that a user of the level may determine from a distance whether the level is level. If the level is unlevel, the concentrated beam of light incident on the first exterior surface of the vial is diffused throughout the vial, and the user sees little or no light, thus recognizing that the level is unlevel.

By constructing a reflecting lighted level as described herein, numerous advantages are realized. For example, a user of the level may easily determine from a distance whether an object the user is leveling is level by simply viewing whether the concentrated beam of light is shining from the vial. Additionally, the user is provided with the option of viewing the vial closely and from any angle, without perceiving a distorted image of the air bubble. If the user chooses to view the vial from a distance, the reflecting lighted level of the present invention is informative of whether the object is center without requiring the user to distinguish between varying degrees of brightness of a concentrated beam of light. Furthermore, the reflecting lighted level of the present invention is small and inexpensive to construct.

These and other important aspects of the present invention are described more fully in the detailed description below.

BRIEF DESCRIPTION OF THE DRAWING FIGURES

First, second, third, fourth, fifth, sixth, and seventh preferred embodiments of the present invention are described in detail below with reference to the attached drawing figures, wherein.

Figure 1:
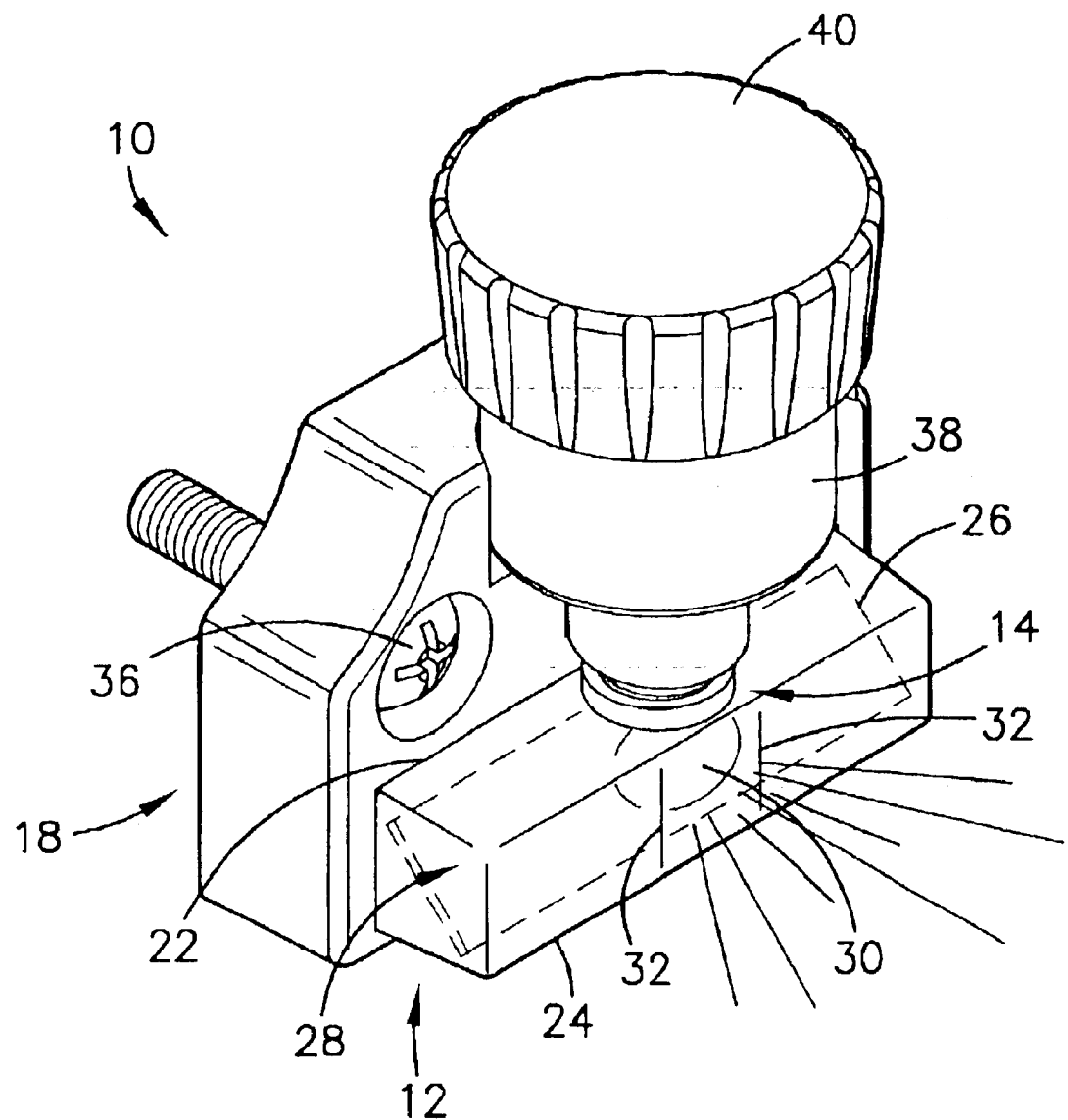
FIG. 1 is an isometric view of a reflecting lighted level constructed in accordance with the first preferred embodiment of the present invention and showing a vial, a light tube for focusing light, a base for supporting the vial, and a control switch having a twist cap.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 2:
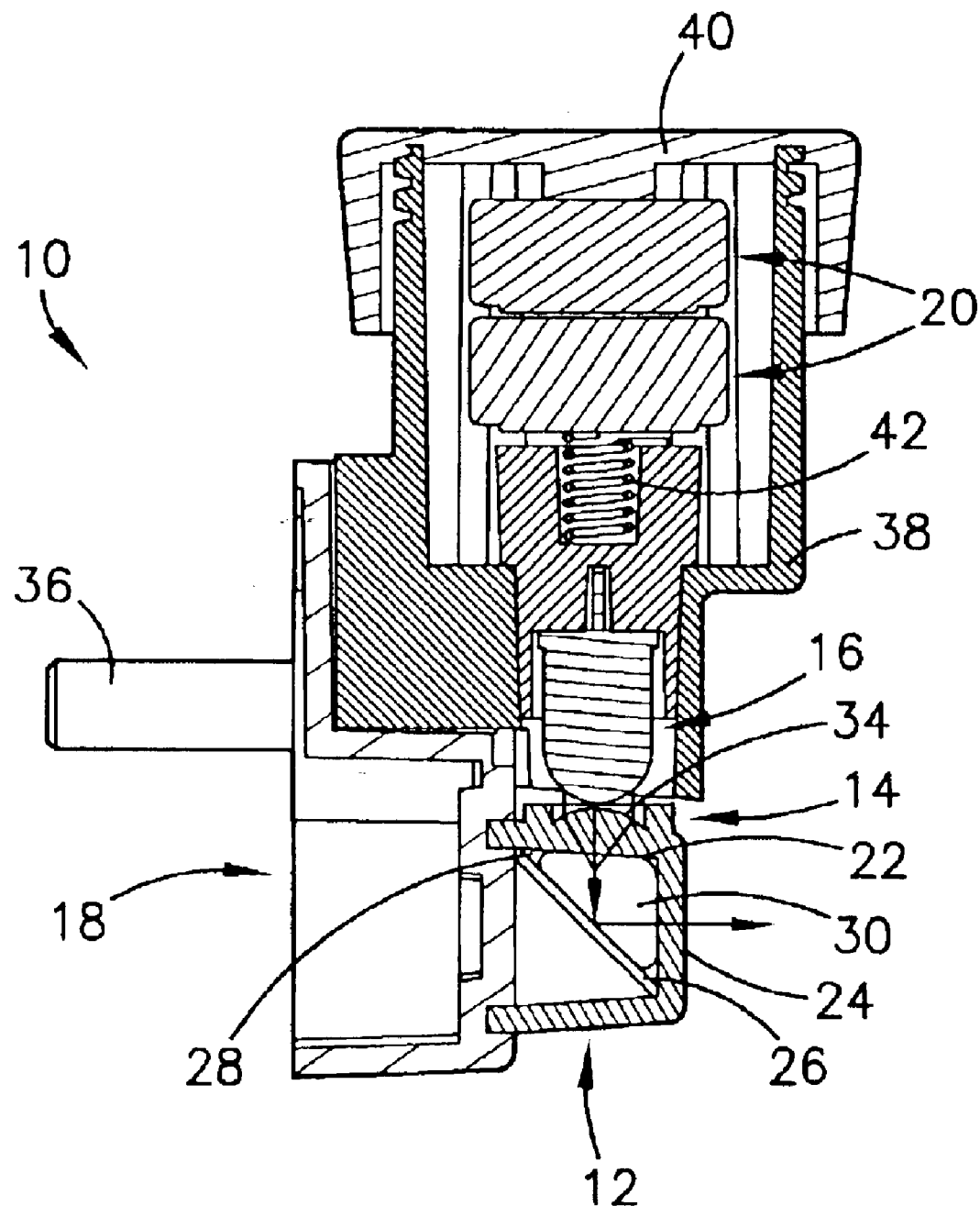
FIG. 2 is a vertical cross-sectional view of the first preferred embodiment of the reflecting lighted level, specifically illustrating an internal angled reflecting surface, a light source, and a power source.

Turning now to the drawing figures, and particularly FIGS. 1 and 2, a reflecting lighted level 10 constructed in accordance with a first preferred embodiment of the invention is illustrated. The reflecting lighted level 10 is operable to reflect a concentrated, illuminated beam of light when the level 10 is level and to diffuse the light when the level 10 is unlevel. The reflecting lighted level 10 broadly includes a vial 12; a light source for emitting light 14; a light tube 16 for focusing or concentrating the emitted light towards the vial 12; a base 18 for supporting the vial 12; and a power source 20 for powering the light source 14.

The vial 12 is preferably generally frustoconically-shaped in horizontal cross-section, as best illustrated in FIG. 2. The vial 12 includes first and second exterior surfaces 22,24 and an internal angled reflecting surface 26, as illustrated in FIGS. 1 and 2. The first and second exterior surfaces 22,24 are positioned at a generally right angle to each other. However, since the vial 12 is preferably frustoconically-shaped, the angle between the first and second exterior surfaces 22,24 is not exactly 90°. The first and second exterior surfaces 22,24 and the angled surface 26 form a hollowed generally triangularly-shaped area 28.

As is well-known in the art, the vial 12 is preferably injected during manufacturing with a liquid, such as mineral spirits, in a sufficient quantity to form an air or gas bubble 30. The vial 12 is then sonic welded so that the liquid may not escape. With regard to the preferred embodiments of the present invention, the formed air bubble 30 resides in the hollowed triangularly-shaped area 28. The vial 12 also preferably includes two marks 32 inscribed on either side of a center of the vial 12. As is also well-known, when the level 10 is level, the air bubble 30 is centered between the two marks 32 so that a user may more easily determine whether an object is level. The vial 12 is preferably constructed of a substantially transparent acrylic but may have a slight hue. In addition, other vial shapes may be used, such as a generally rectangularly-shaped or triangularly-shaped vial 12.

The first exterior surface 22 or input surface 22 of the vial 12 is preferably generally flat, where the input surface 22 is defined as the surface 22 of the vial on which the emitted light is incident. When the input surface 22 is generally flat, any light refracted through the input surface 22 does not change direction or changes direction to a negligible extent. Alternatively, the input surface 22 may include a convexity 34, as illustrated in FIG. 2, wherein the convexity 34 converges the light so as to further focus the light, along with the light tube 16, as discussed in more detail below. The convexity 34 may range in size or radius of curvature, depending on the size of the vial 12, the width of the concentrated beam of light, and/or the angle at which the light is to be reflected. An even further alterative for the input surface 22 may include one or more lenses (not shown) whose aggregation of optical properties converges the light incident upon the input surface 22 of the vial 12.

The internal angled reflecting surface 26 is preferably angled at a generally 45° angle, but the angle measurement may range between 5° and 85°, depending on the size and shape of the vial 12 and the preferred positioning of the reflected light. The angled surface 26 is preferably highly polished acrylic such that the surface 26 is substantially transparent to facilitate the light reflecting off of the surface 26, as discussed in more detail below. Other alternative angled reflecting surfaces 26 may be used, such as a mirrored surface.

The light source 14 is preferably a light emitting diode ("LED") 14, although any suitable light source 14 may be used, such as an incandescent bulb. For the first preferred embodiment, the LED 14 is preferably colored red and has a diameter of 5 mm. Other colors and differently sized LEDs 14 may be used depending on the manufacturer's preference, the size of the level 10, or the intended use of the level 10. The light source 14 is preferably centrally positioned relative to the vial 12, as discussed in more detail below.

The light tube 16 is preferably formed to the vial 12, as best illustrated in FIG. 2. Alternatively, the light tube 16 may be formed to the base 18 or other suitable locations such that the light tube 16 is proximate to the vial 12. The light tube 16 is generally circularly-shaped and is spaced approximately 3.5 mm from the vial, although the light tube 16 may be spaced between 0 mm and 8 mm from the vial 12. The light tube 16 is preferably formed of an opaque plastic or other suitable material. Any light transmitted through the light tube 16, as described below, preferably does not refract through the light tube 16, although minute amounts of refracted light do not detract from the operability of the present invention. The light tube's 16 primary purpose, which is of importance to the present invention, is to focus or concentrate light transmitted through the light tube 16, as described below, such that the light incident upon the vial 12 is formed in a substantially concentrated beam. The light tube 16 is preferably centrally positioned relative to the vial 12, as is described in more detail below.

The light source 14 is preferably partially positioned within the light tube 16, as illustrated in FIG. 2, such that the light tube 16 is positioned between the light source 14 and the vial 12. Alternatively, the light tube 16 may completely surround the light source 14. In this alternative, the light tube 16 may be formed elsewhere, such as to the base 18, as noted above. In operation, the light emitted by the light source 14 is transmitted through the light tube 16 and is incident on the first exterior surface 22 of the vial 12, as described in more detail below.

The vial 12 is preferably mounted to the base 18. The base 18 may be secured to a surface using at least one screw 36, but preferably two screws 36, as illustrated in FIG. 1. Alternatively, the base 18 may be secured to a surface using adhesive or any other suitable securing means, such as VELCRO. The base 18 is preferably formed of a rigid plastic, but other suitable materials may be used.

The base 18 preferably includes a housing portion 38 in which the light source 14 and the power source 20 are fully or partially contained. As illustrated in FIG. 2, the light source 14 is partially housed within the housing 38 and extends beyond the housing 38 such that a tip of the light source 14 is positioned within the light tube 16, as described above. The housing 38 preferably houses a control switch 40 for activating/deactivating power to the light source 14. As illustrated in FIGS. 1 and 2, the control switch 40 is a mechanical twist switch 40 having a spring 42 for activating/deactivating the light source 14, although the control switch 40 may be any suitable switch, such as a slide switch or mercury switch.

The power source 20 is preferably two coin cell batteries 20, which are housed within the housing 38. Other suitable power sources 20 may be used, such as an electrically wired power source or a solar power source. For example, if the level 10 was to be used for leveling recreational vehicles ("RVs"), the level 10 could be secured to an outside of the RV and wired to a control switch 40 that is within easy access of a driver of the RV.

The level 10 is designed to reflect light when the level 10 is level and to diffuse light so that little or no light is concentrated when the level 10 is unlevel. A user of the level 10 can then determine whether an object is level even when viewing the level 10 at a distance. To reflect the light so that it can easily be seen by the user, the level 10 focuses the light emitted by the light source 14 using the light tube 16. The light incident on the first exterior surface 22 of the vial 12 is then controlled in width so as to form a concentrated beam of light. If the level 10 is level, the beam of light refracts through the air bubble 30, since the air bubble 30 is centered within the vial 12, and reflects off of the internal angled reflecting surface 26 at a generally 90° angle. The light then exits the second exterior surface 24 of the vial 12 as a still concentrated beam of light. If the level 10 is unlevel, the concentrated beam of light refracts through the mineral spirits and reflects off of the internal angled reflecting surface 26. Since the mineral spirits has a different refractive index than the air bubble 30, the light diffuses through the vial 12 when the level 10 is unlevel and the light is refracted though the mineral spirits. Thus, when the level 10 is unlevel, the user of the level 10 does not see a concentrated beam of light exiting the second exterior surface 24 of the vial 12. Instead, the user merely sees the light diffused or dispersed throughout the vial 12, and thus, the user knows the object is not level.

Figure 3:
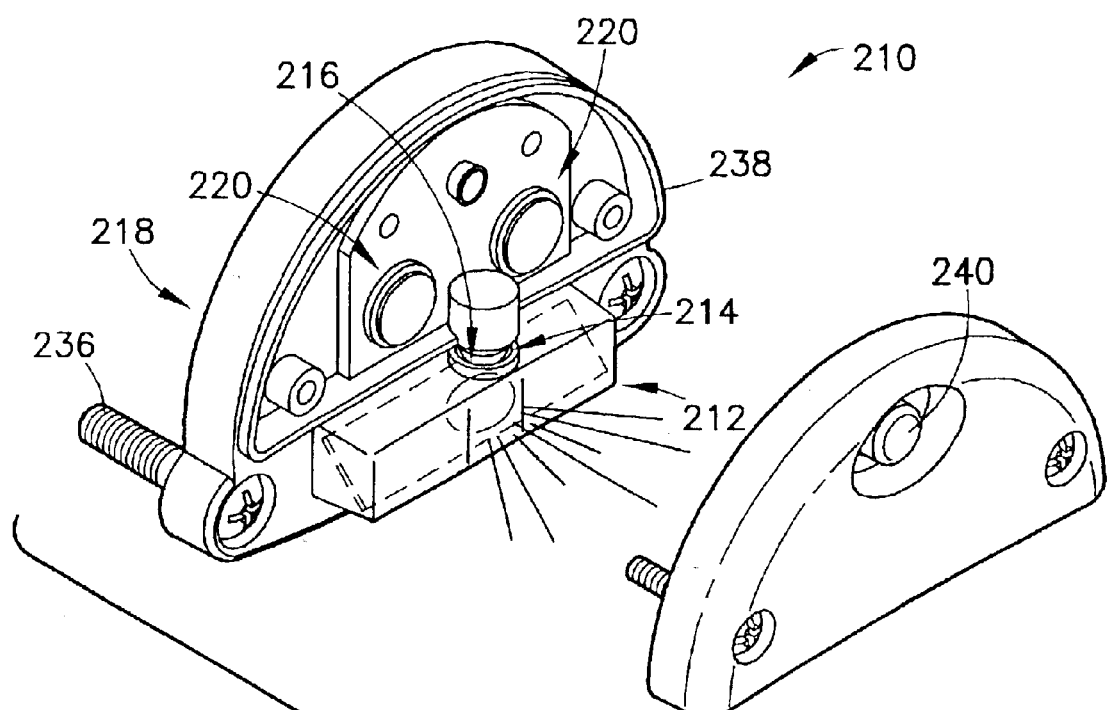
FIG. 3 is an exploded isometric view of the second preferred embodiment having a control switch that is a push-button switch.

In a second preferred embodiment, a level 210 is substantially similar to the level 10 of the first preferred embodiment, except for a base 218 and a housing portion 238. As illustrated in FIG. 3, the base 218 is preferably generally semi-circularly shaped. The base 218 may be secured to a surface using at least one screw 236, but preferably two screws 236. The base 218 is preferably formed of rigid plastic, although other suitable materials may be used.

A vial 212 substantially similar to the vial 12 of the first preferred embodiment is preferably positioned at a lower end of the base 218. A power source 220 is fully or partially contained within the housing 238. Similar to the first preferred embodiment, a light source 214 is partially housed within the housing 238 and extends beyond the housing 238, such that a tip of the light source 214 is positioned within a light tube 216. A control switch 240 is preferably housed within the housing 238. Unlike the first preferred embodiment, the control switch 240 is preferably an electrical push-button switch 240 having a timer (not shown) for activating the power source 220 for a predetermined length of time. The electrical control switch 240 then automatically deactivates the power source 220 after the specified time has elapsed.

Figure 4:
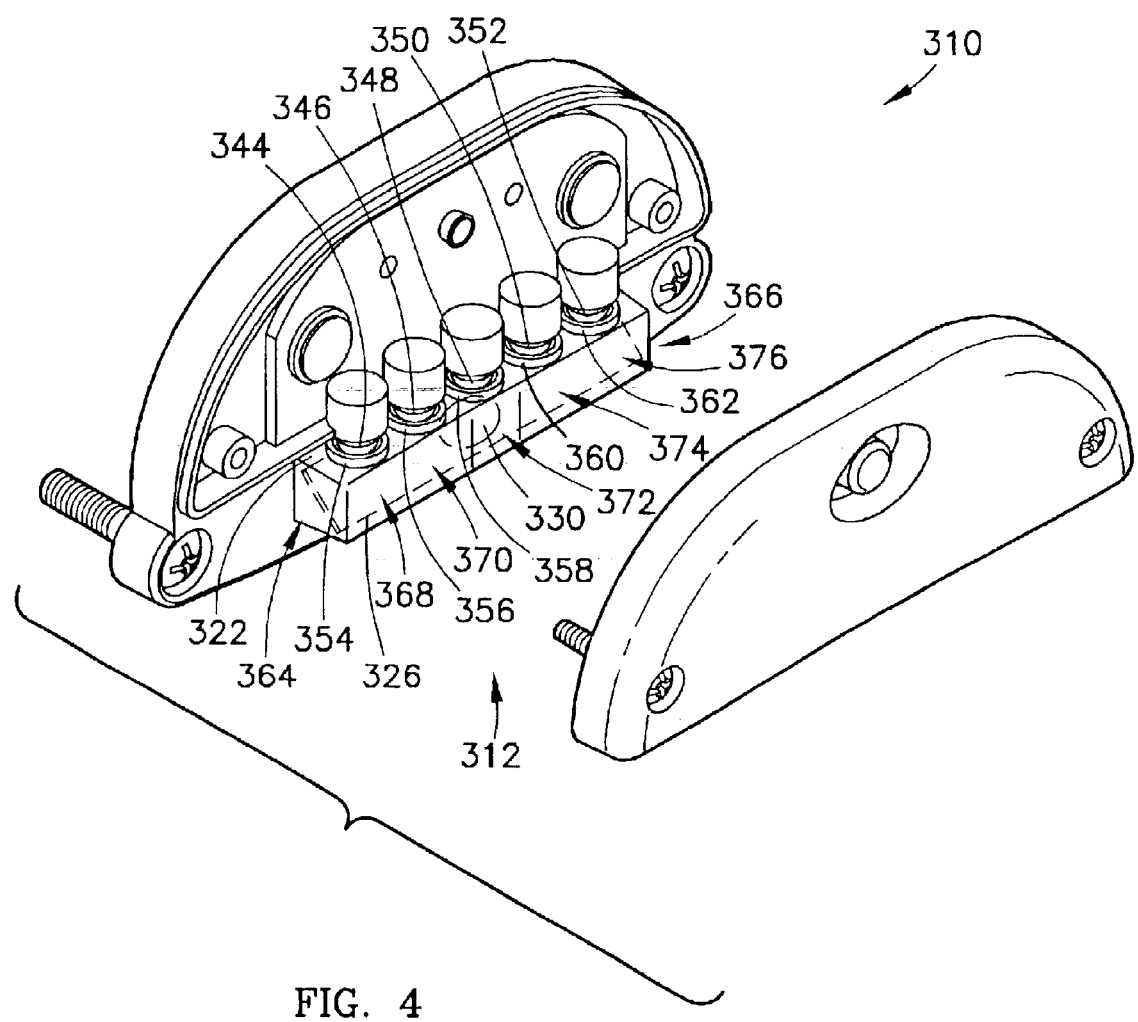
FIG. 4 is an exploded isometric view of the third preferred embodiment having five light sources and five light tubes.
Figure 5:
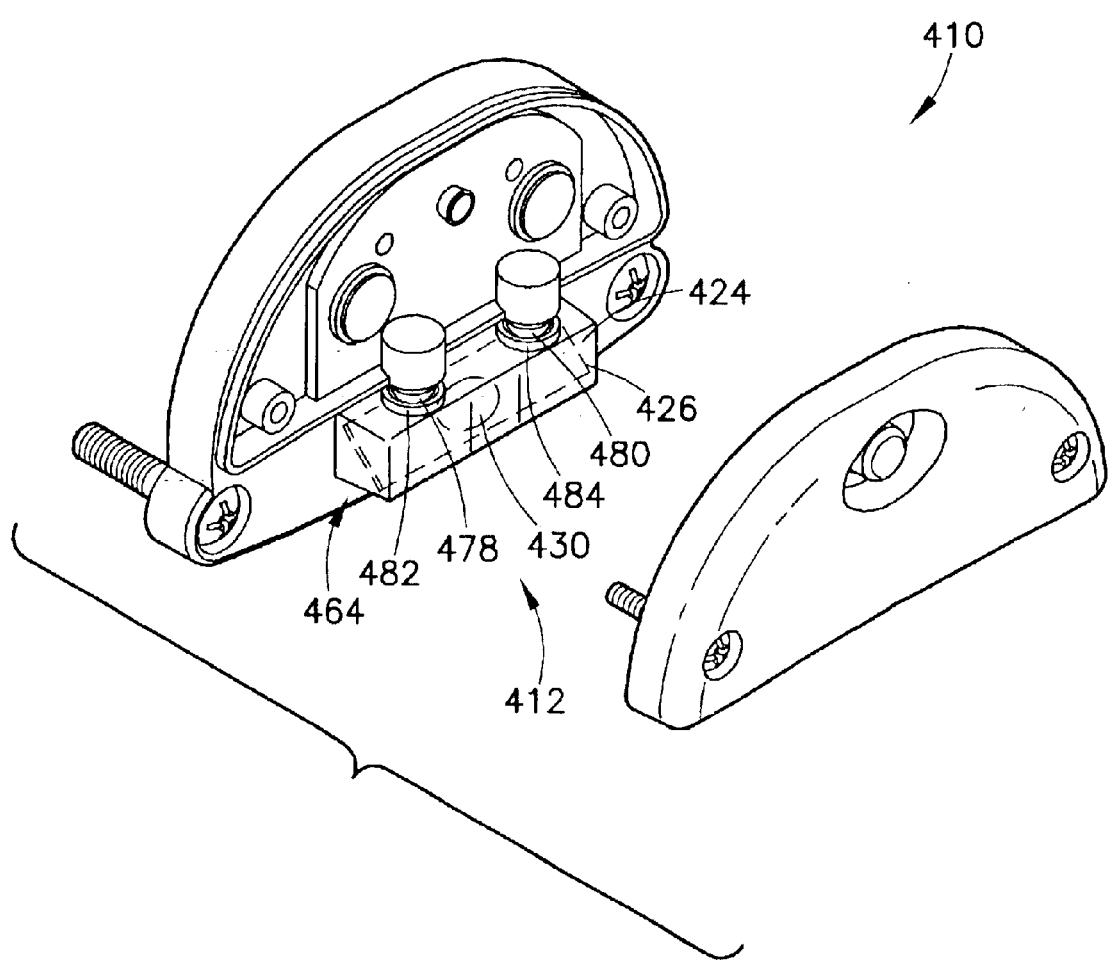
FIG. 5 is an exploded isometric view of the fourth preferred embodiment having two light sources and two light tubes generally positioned on either side of a center of a vial.

In a third preferred embodiment, a level 310 is substantially similar to the level 210 of the second preferred embodiment, except it includes first, second, third, fourth, and fifth light sources 344,346,348,350,352 and first, second, third, fourth, and fifth light tubes 354,356,358,360, 362, as illustrated in FIG. 4. Similar to the second preferred embodiment, each light tube 354,356,358,360,362 is positioned proximate to a first exterior surface 322 of a vial 312, with the first light tube 354 being positioned at a first end 364 of the vial 312, the second light tube 356 being positioned next to the first light tube 354 and opposite the first end 364 of the vial 312, the third light tube 358 being positioned generally center of the vial 312 and next to the second light tube 356, the fourth light tube 360 being positioned next to the third light tube 358 and opposite the second light tube 356, and the fifth light tube 362 being positioned next to the fourth light tube 360 and at a second end 366 of the vial 312. Similar to the first preferred embodiment, the first through fifth light sources 344,346, 348,350,352 are partially positioned within the first through fifth light tubes 354,356,358,360,362. The first light source 344 corresponds with the first light tube 354. Similarly, the second light source 346 corresponds to the second light tube 354, the third light source 348 corresponds to the third light tube 358, etc. The first and fifth light sources 344,352 are preferably red in color, the purpose of which is described below. The second and fourth light sources 346,350 are preferably yellow in color, and the third and center light source 348 is preferably green in color.

When the level 310 is substantially unlevel and tilted towards the first end 364 of the vial 312, an air bubble 330 formed within the vial 312 is consequently positioned at the first end 364 of the vial 312. Alternatively, the level 310 may still be substantially unlevel and tilted towards the second end 366 of the vial 312. The air bubble 330 is then consequently positioned at the second end 366 of the vial 312. Similar to the first preferred embodiment, when the red concentrated beam of light emitted by the first light source 344 shines through the air bubble 330 at the first end 364 of the vial 312 (or at the second end 366, depending to which end 364,366 an object is angled), the red concentrated beam of light is reflected off of an internal angled reflecting surface 326 at a generally 90° angle so that the user sees a red light. The colors emitted by the second, third, fourth, and fifth light sources 346,348,350,352 are diffused through the mineral spirits contained within the vial 312. If the level 310 is moderately unlevel, then the yellow light emitted by the second light source 346 shines through the air bubble 330, thus reflecting the yellow light. The remaining colored light is diffused through the mineral spirits contained within the vial 312. If the level 310 is level, then the air bubble 330 is positioned at center of the vial 312, and green light shines through the vial 312. Therefore, a user can easily determine whether the object being leveled is substantially unlevel, moderately unlevel, or level.

The angle at which the level 310 is substantially unlevel, as the term is used above, may be defined as any angle between 2° and 90°. The angle at which the level 310 is moderately unlevel, as the term is used above, may be defined as any angle between 0° and 10°, wherein the ranges for substantially unlevel and moderately unlevel may overlap. The angle at which the level 310 is level may be defined as any angle of approximately 0°. As can be understood by those skilled in the art, minute amounts of angle displacement may still correspond to a level 310 that is substantially level and thus, a level 310 that transmits a generally concentrated green beam of light.

Alternatively, substantially unlevel and moderately unlevel may be defined with reference to a region in which the air bubble 330 is positioned. In the second preferred embodiment, a length of the vial 312 may divided into first, second, third, fourth, and fifth regions 368,370,372,374,376, as illustrated in FIG. 4. Although each region 368,370,372, 374,376 is not an actual physical characteristic of the vial 312, the regions 368,370,372,374,376 are helpful in defining the delineation between substantially unlevel, moderately unlevel, and level. The first region 368 corresponds to the first light source 344, the second region 370 corresponds to the second light source 346, etc. If the level 310 is substantially unlevel, then the level 310 is positioned at an angle which positions substantially all of the air bubble 330 in either the first region 368 or the fifth region 376 of the vial 312 or proximate to the first light source 344 or the fifth light source 352. Similarly, if the level 310 is moderately unlevel, then the level 310 is positioned at an angle which positions substantially all of the air bubble 330 in either the second region 370 or the fourth region 374 of the vial 312 or proximate to the second light source 346 or the fourth light source 350.

The third preferred embodiment may include more or less than the first through the fifth light sources 344,346,348, 350,352. For example, the level 310 may have first, second, and third light sources (not shown), corresponding to three distinct regions (not shown). The first and third light sources may be positioned proximate to the vial 312 and on either side of center of the vial 312. The second light source may then be positioned at substantially center of the vial 312. The first and third light sources may emit red light, and the second light source may emit green light so that when the level 310 is unlevel, a red beam of light transmits through a second exterior surface 324 of the vial 312, and when the level 310 is level, a green beam of light transmits through the second exterior surface 324 of the vial 312. Alternatively, the level 310 of the third preferred embodiment may include more than the five light sources 344,346.348,350,352 corresponding to more than the five regions 368,370,372,374, 376 of the vial 312.

In a fourth preferred embodiment of the present invention, a level 410 is substantially similar to the levels 210,310 of the second and third preferred embodiments, except the level 410 includes first and second light sources 478,480 corresponding to first and second light tubes 482,484 positioned on either side of center of a vial 412. The first and second light sources 478,480 and the first and second light tubes 482,484 are substantially similar to the light source 14 and light tube 16 of the first preferred embodiment. No light source is positioned proximate to center of the vial 412. Therefore, when the level 410 is unlevel and tilted towards a first end 464 of the vial 412, the light transmitted by the first light source 478 refracts through an air bubble 430, reflects off of an internal angled reflecting surface 426 at a generally 90° angle, and exits a second exterior surface 424 of the vial 412. When the level 410 is level, the light emitted by the first and second light sources 478,480 is diffused, and thus, no concentrated beam of light is transmitted through the second exterior surface 424 of the vial 412.

Figure 6:
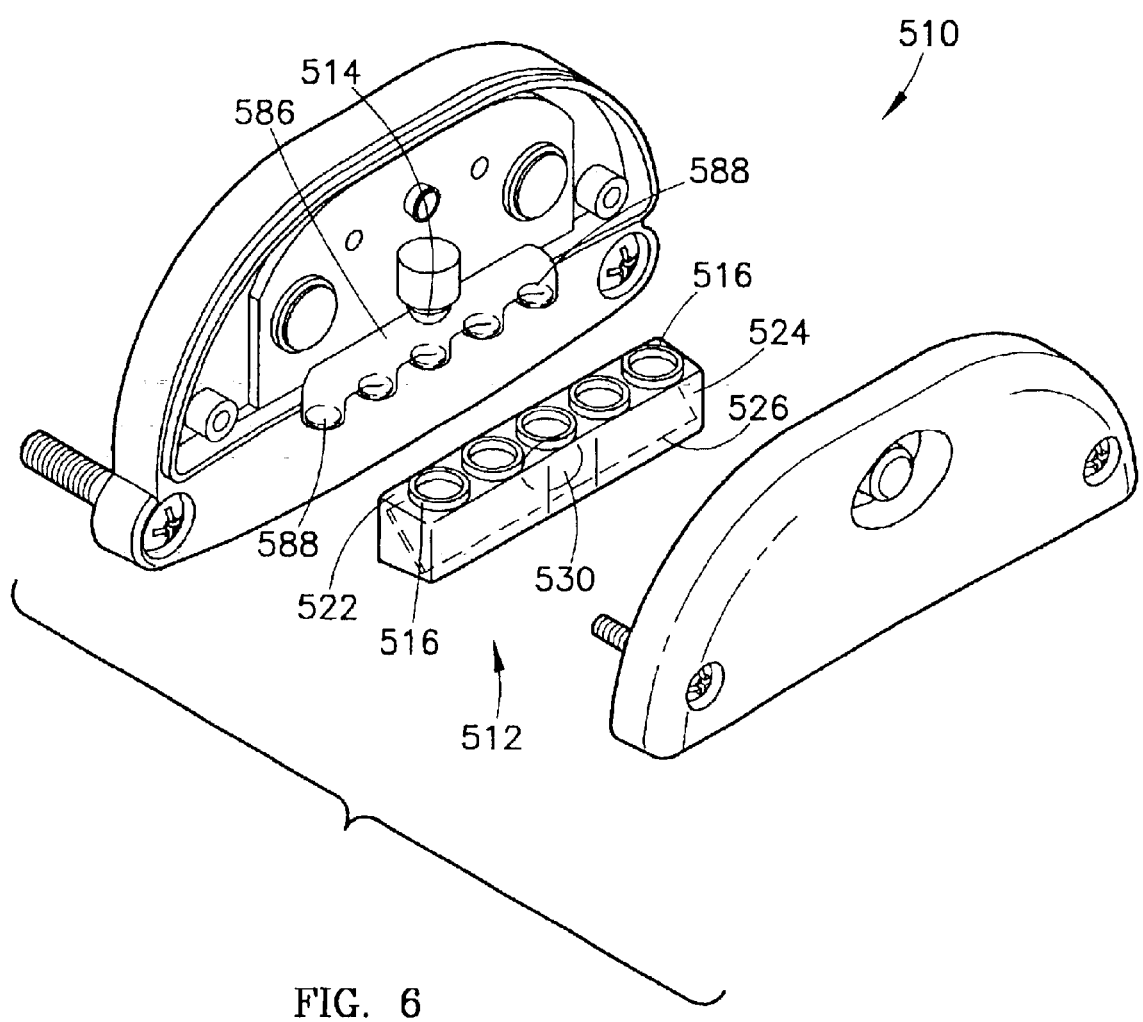
FIG. 6 is an exploded isometric view of the fifth preferred embodiment having one light source and a lightpipe for emitting various colors of light.

In a fifth preferred embodiment of the present invention, as illustrated in FIG. 6, a level 510 substantially similar to the level 210 of the second preferred embodiment, further includes a lightpipe 586 having a plurality of transparent colored inserts 588. The lightpipe 586 is preferably approximately the length of a vial 512 and is positioned proximate to the vial 512. The lightpipe 586 is preferably substantially opaque and is preferably made of plastic or other suitable material. A plurality of light tubes 516 corresponding to each colored insert 588 is preferably positioned between the lightpipe 586 and the vial 512. A light source 514 of the fifth preferred embodiment is positioned generally center of the vial 512 and proximate to the lightpipe 586, such that the light emitted by the light source 514 is transmitted through the lightpipe 586. Alternatively, the light source 514 may be positioned elsewhere and still proximate to the lightpipe 586, such as at an end of the lightpipe 586. As the light from the light source 514 is transmitted through each colored insert 588 and corresponding light tube 516, the light incident on a first exterior surface 522 of the vial 512 is focused and concentrated. Similar to the previous embodiments, if an air bubble 530 is positioned proximate to the light tube 516, then the concentrated beam of light exiting the light tube 516 reflects off of an internal angled reflecting surface 526 at a generally 90° angle and exits a second exterior surface 524 of the vial 512 in a generally concentrated beam. The light exiting the remainder of the light tubes 516 is diffused through the mineral spirits. An advantage of the fifth preferred embodiment is that only one light source 514 need be used while still providing differently colored light.

Figure 7:
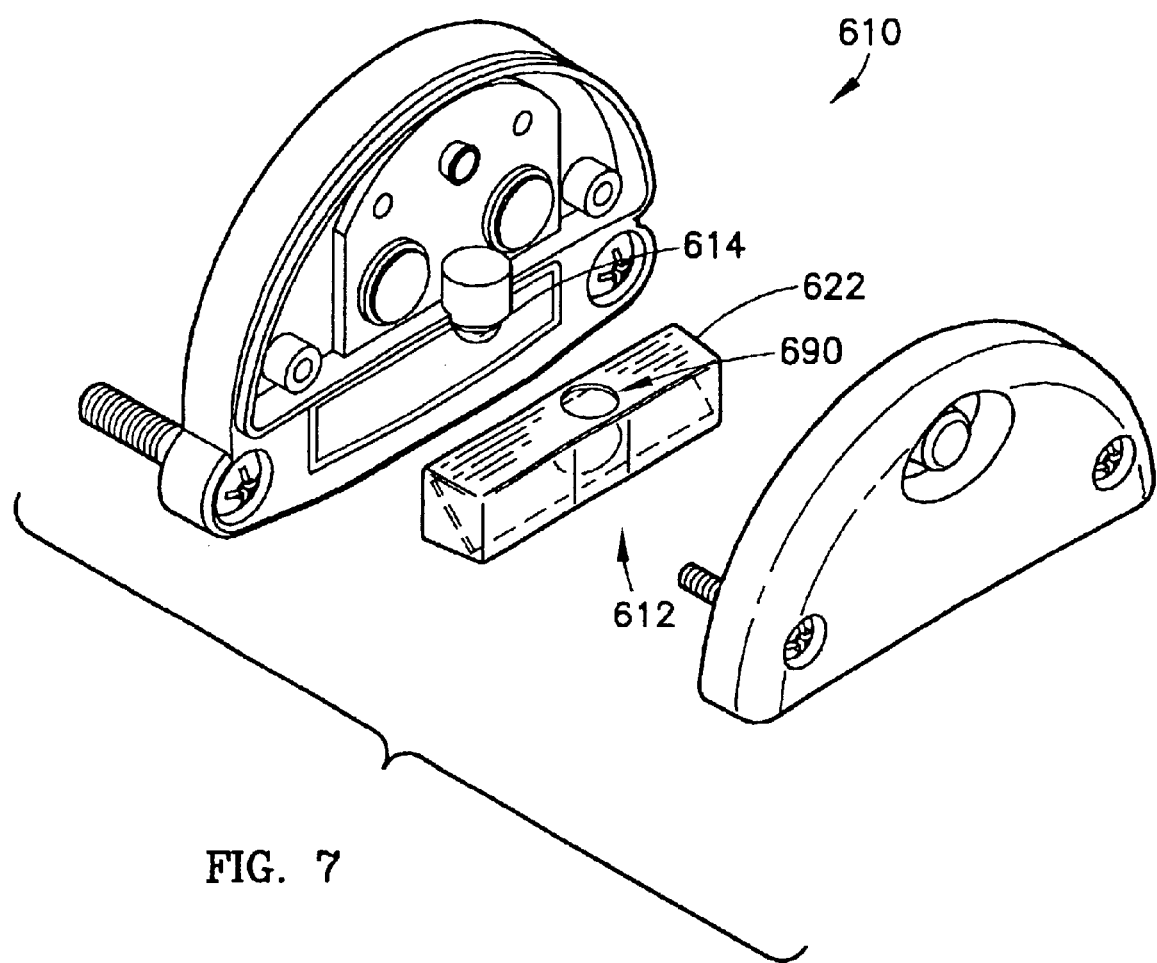
FIG. 7 is an exploded isometric view of the sixth preferred embodiment, wherein a first exterior surface of a vial is opaque, and the first exterior surface includes a transparent portion.

In a sixth preferred embodiment of the present invention, a level 610 substantially similar to the level 210 of the second preferred embodiment includes a vial 612 having a first exterior surface 622 that is preferably substantially opaque, as illustrated in FIG. 7, except for a portion 690 of the first exterior surface 622, which is transparent or non-opaque. The transparent or non-opaque portion 690 is preferably positioned generally center of the vial 612. If multiple light sources 614 are used, as in the fourth and fifth embodiments, then multiple transparent portions (not shown) are preferably positioned generally proximal to each light source (not shown). The effect is that any light emitted by the light source 614 is preferably incapable of being transmitted through the first exterior surface 622 of the vial 612, other than the transparent portion 690. In the sixth preferred embodiment, the level 610 may include a light tube (not shown) substantially similar to the light tube 216 of the second preferred embodiment, although the light tube need not be used. Use of the light tube, however, does not affect the operability of the level 610.

Figure 8:
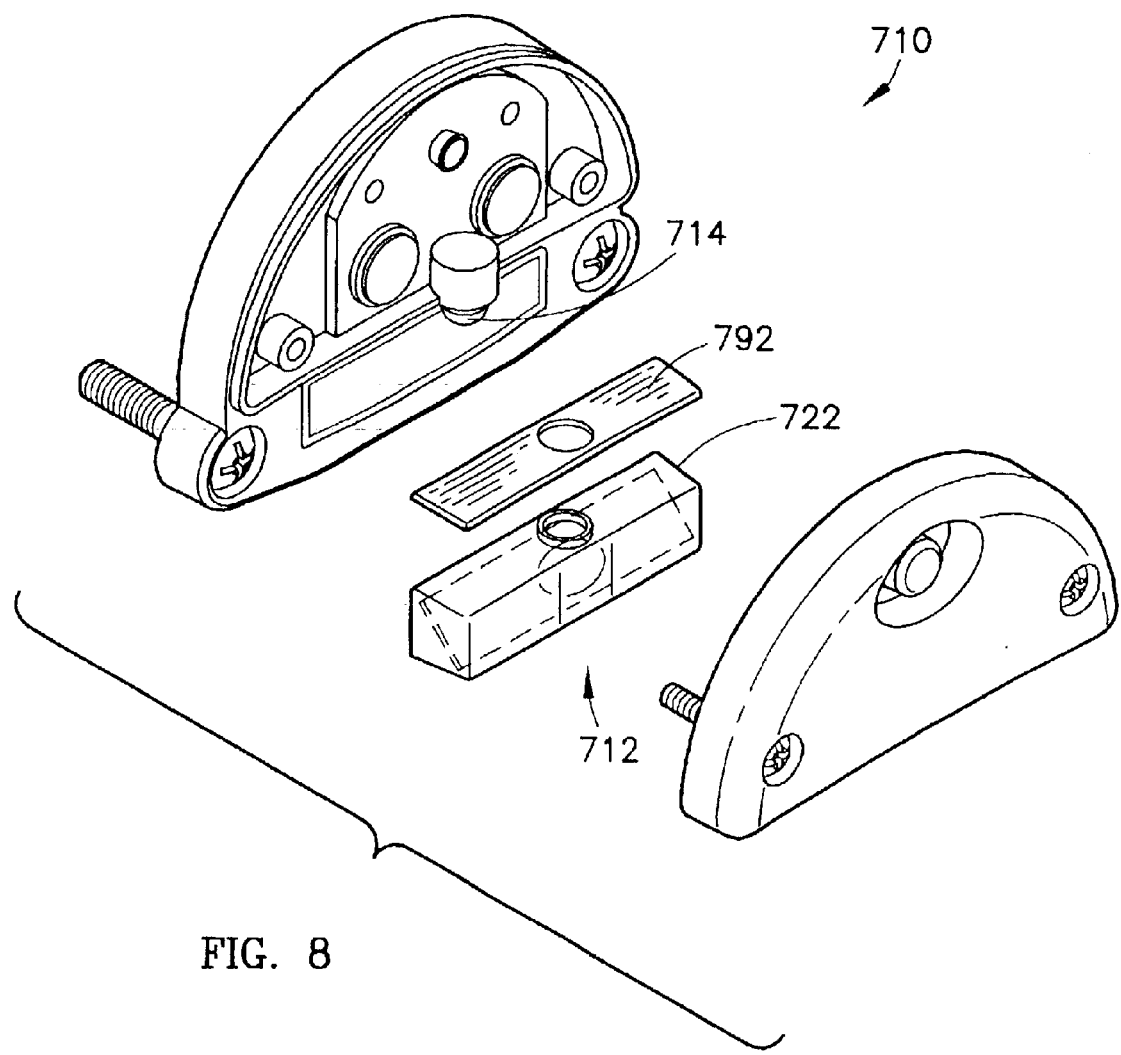
FIG. 8 is an exploded isometric view of the seventh preferred embodiment, illustrating an opaque screen adapted to be positioned adjacent to a first exterior surface of the vial.

In a seventh preferred embodiment, a level 710 substantially similar to the level 610 of the sixth preferred embodiment includes a vial 712 having a first exterior surface 722. A screen, mask, or other type of film 792 is positioned adjacent or proximate to the first exterior surface 722, as illustrated in FIG. 8. The screen 792 is substantially opaque, such that no light is allowed to be transmitted through the screen 792. The screen 792 includes an opening or non-opaque portion 794 through which light produced by a light source 714 may be transmitted. Thus, the screen 792 prevents light produced by the light source 714 from transmitting through the first exterior surface 722, except for through the opening or non-opaque portion 794. The screen 792 may be formed onto the first exterior surface 722 or secured to the first exterior surface 722 using suitable securement methods, such as adhesive.

Although the invention has been described with reference to the preferred embodiment illustrated in the attached drawing figures, it is noted that equivalents may be employed and substitutions made herein without departing from the scope of the invention as recited in the claims. For example, the level 10, and consequently the vial 12, is not limited in size. Therefore, the level 10 may include more or less light tubes 16 and light sources 14. The color emitted by the light source 14 may also differ. Additionally, the levels 210,310,410,510,610,710 of the second through seventh preferred embodiments may alternatively have a base and a housing portion substantially similar to the base 18 and housing portion 38 of the first preferred embodiment.

Having thus described the preferred embodiment of the invention, what is claimed as new and desired to be protected by letters patent includes the following:

1. A level comprising:
   a vial having a first exterior surface and an internal angled reflecting surface;
   at least one light source for emitting light; and
   at least one light tube positioned between the light source and the vial, such that the light transmits through the light tube, exits the light tube in a substantially concentrated beam, and is incident on the first exterior surface.

2. The level as claimed in claim 1, the vial further including a second exterior surface, and the level further including
   power source operable to power the light source, and
   a base for supporting the vial, the base including a housing portion within which the power source is contained.

3. The level as claimed in claim 2, wherein the light source is a light emitting diode and the power source is two coin cell batteries.

4. The level as claimed in claim 3, wherein the light source and the light tube are centrally positioned relative to the first exterior surface of the vial.

5. The level as claimed in claim 3, wherein if the level is level, the light reflects off of the internal angled reflecting surface at a generally 90° angle and exits the second exterior surface in a generally concentrated beam, and if the level is not level, the light is diffused.

6. The level as claimed in claim 3, wherein the light source is a first light source and the level further includes second, third, fourth and fifth light sources and corresponding light tubes, wherein the first and fifth light sources emit light of a first color, the second and fourth light sources emit light of a second color, and the third light source emits light of a third color.

7. The level as claimed in claim 6, wherein if the level is substantially unlevel and tilted towards a first end of the vial, the light emitted by the first light source reflects off of the internal angled reflecting surface at a generally 90° angle and exits the second exterior surface in a generally concentrated beam, and the light emitted by the second, third, fourth, and fifth light sources is diffused.

8. The level as claimed in claim 7, wherein if the level is moderately unlevel and tilted towards the first end of the vial, the light emitted by the second light source reflects off of the internal angled reflecting surface at a generally 90° angle and exits the second exterior surface in a generally concentrated beam, and the light emitted by the first, third, fourth, and fifth light sources is diffused.

9. The level as claimed in claim 8, wherein if the level is level, the light emitted by the third light source reflects off of the internal angled reflecting surface at a generally 90° angle and exits the second exterior surface in a generally concentrated beam, and the light emitted by the first, second, fourth, and fifth light sources is diffused.

10. The level as claimed in claim 3, wherein the light source is a first light source and the light tube is a first light tube and the level further includes a second light source and a second light tube, the first and second light sources being positioned on either side of a center of the vial, such that if the level is level, the light emitted by the first and second light sources is diffused, and if the level is not level and tilted towards a first end of the vial, the light emitted by the first light source reflects off of the internal angled reflecting surface at a generally 90° angle and exits the second exterior surface in a generally concentrated beam.

11. A reflecting lighted level, the level comprising:
   a generally frustoconically-shaped vial having first and second exterior surfaces and an internal angled reflecting surface;
   at least one light source for emitting light;
   at least one light tube positioned between the light source and the vial, such that the light transmits through the light tube, exits the light tube in a substantially concentrated beam, and is incident on the first exterior surface, whereby if the level is level, the light reflects off of the internal angled reflecting surface at a generally 90° angle and exits the second exterior surface in a generally concentrated beam, and if the level is not level, the light is diffused; and
   a power source operable to power the light source.

12. The reflecting lighted level as claimed in claim 11, the level further including a base for supporting the vial, the base including a housing portion within which the power source is contained.

13. The reflecting lighted level as claimed in claim 12, wherein the light source is a light emitting diode and the power source is two coin cell batteries.

14. The reflecting lighted level as claimed in claim 13, wherein the light source is a first light source and the reflecting lighted level further comprises second and third light sources and corresponding light tubes, the second light source being positioned proximate to the first light source, and the third light source being positioned proximate to the first light source and opposite the third light source.

15. The reflecting lighted level as claimed in claim 14, wherein the first light source emits light of a first color, and the second and third light sources emit light of a second color, wherein the light of a first color is different than the light of a second color.

16. The reflecting lighted level as claimed in claim 15, wherein if the level is unlevel and tilted towards a first end of the vial, the light emitted by the second light source reflects off of the internal angled reflecting surface at a generally 90° angle and exits the second exterior surface in a generally concentrated beam, and the light emitted by the first and third light sources is diffused.

17. The reflecting lighted level as claimed in claim 13, further comprising a mechanical control switch including a twist cap and a spring for activating the power source.

18. The reflecting lighted level as claimed in claim 13, further comprising an electrical control switch including a timer for activating the power source for a predetermined length of time.

19. A reflecting lighted level, the level comprising:
a vial having first and second exterior surfaces and an internal angled reflecting surface;
first, second, third, fourth, and fifth light sources for emitting light;
first, second, third, fourth, and fifth light tubes, each tube positioned between a corresponding light source and the vial, the first light tube being positioned proximate to the first light source, the second light tube being positioned proximate to the second light source, the third light tube being positioned proximate to the third light source, the fourth light tube being positioned proximate to the fourth light source, and the fifth light tube being positioned proximate to the fifth light source, wherein the first and fifth light sources emit light of a first color, the second and fourth light sources emit light of a second color, and the third light source emits light of a third color, such that
if the level is substantially unlevel and tilted towards a first end of the vial, the light emitted by the first light source reflects off of the internal angled reflecting surface at a generally 90° angle and exits the second exterior surface in a generally concentrated beam, and the light emitted by the second, third, fourth, and fifth light sources is diffused,
if the level is moderately unlevel and tilted towards the first end of the vial, the light emitted by the second light source reflects off of the internal angled reflecting surface at a generally 90° angle and exits the second exterior surface in a generally concentrated beam, and the light emitted by the first, third, fourth, and fifth light sources is diffused, and
if the level is level, the light emitted by the third light source reflects off of the internal angled reflecting surface at a generally 90° angle and exits the second exterior surface in a generally concentrated beam, and the light emitted by the first, second, fourth, and fifth light sources is diffused; and
a power source operable to power the light source.

20. The reflecting lighted level as claimed in claim 19, wherein substantially unlevel corresponds to an angle measurement between 2° and 90°, moderately unlevel corresponds to an angle measurement between 0° and 2°, and level corresponds to an angle measurement of approximately 0°.

21. A reflecting lighted level, the level comprising:
a vial having first and second exterior surfaces and an internal angled reflecting surface;
first and second light sources for emitting light, wherein the first and second light sources are positioned on either side of center of the vial;
first and second light tubes, each light tube positioned proximate to the first exterior surface of the vial, the first light tube being positioned proximate to the first light source, and the second light tube being positioned proximate to the second light source, such that if the level is level, the light emitted by the first and second light sources is diffused, and if the level is unlevel and tilted towards a first end of the vial, the light emitted by the first light source reflects off of the internal angled reflecting surface at a generally 90° angle and exits the second exterior surface in a generally concentrated beam; and
a power source operable to power the light source.

22. A reflecting lighted level, the level comprising:
a vial;
at least one light source for emitting light;
a plurality of light tubes, each light tube positioned proximate to the vial; and
a lightpipe having a plurality of colored inserts corresponding to the number of light tubes, wherein the lightpipe is positioned proximate to the light tubes and opposite the vial, such that light emitted by the light source transmits through the lightpipe and through each light tube, whereby the light incident on the vial is comprised of a plurality of colors.

23. A level comprising:
a vial having a first exterior surface and an internal angled reflecting surface, wherein the first exterior surface has an opaque portion and a non-opaque portion, wherein the non-opaque portion is positioned generally center of the vial; and
at least one light source for emitting light, wherein the light source is positioned generally proximal to the first exterior surface and generally center of the vial, such that the light emitted by the light source transmits through the non-opaque portion, whereby if the level is level, the light reflects off of the internal angled reflecting surface at a generally 90° angle and exits the vial in a generally concentrated beam, and if the level is not level, the light is diffused.

24. A level comprising:
a vial having a first exterior surface and an internal angled reflecting surface;
a screen positioned adjacent to the first exterior surface of the vial, wherein the screen has an opaque portion and a non-opaque portion, wherein the nonopaque portion is positioned generally center of the vial; and
at least one light source for emitting light, wherein the light source is positioned generally proximal to the first exterior surface and generally center of the vial, such that the light emitted by the light source transmits through the non-opaque portion of the screen, whereby if the level is level, the light reflects off of the internal angled reflecting surface at a generally 90° angle and exits the vial in a generally concentrated beam, and if the is not level, the light is diffused.

25. The level as claimed in claim 24, wherein the non-opaque portion of the screen is an opening in the screen.

* * * * *